3,063,795
PREPARATION OF AMMONIUM META-
VANADATE
George S. Smith, Rifle, Colo., assignor to Union Carbide
Corporation, a corporation of New York
No Drawing. Filed Mar. 1, 1961, Ser. No. 92,443
2 Claims. (Cl. 23—51)

The present invention pertains to the production of pure ammonium metavanadate. More particularly, the present invention pertains to a process for production of pure ammonium metavanadate directly from acidic solvent extraction strip solutions in a single precipitation step.

Vanadium extraction from the mother ore commonly is effected by acid leaching vanadium bearing ore in a sulfuric acid leach solution. The resulting leach liquor is classified by countercurrent decantation to produce a clear leach liquor substantially free of entrained solids and slimes. Vanadium is present in the leach liquor as vanadyl sulfate. Vanadium may be removed from the leach liquor by solvent extraction techniques utilizing organic extractants such as di(2-ethylhexyl) phosphoric acid. The loaded organic extractant is then stripped by a sulfuric acid strip solution and vanadium passes from the organic extractant to the acidic strip solution as vanadyl ions ($VO_2^{+2}$). The strip solutions commonly contain 10–15 percent sulfuric acid and about 6 to 10 percent vanadium pentoxide as vanadyl ion along with other impurities such as iron, alumina, phosphate, and arsenates.

The strip solution is then oxidized with sodium chlorate and partially neutralized with sodium carbonate to precipitate an intermediate sodium polyvanadate containing the above impurities. This product is termed "red cake."

To obtain a pure vanadium pentoxide, the precipitate is redissolved in hot ammonium hydroxide and the solution is thickened and filtered to remove hydrated impurities. The clear solution containing vanadium is then treated with ammonium chloride to precipitate ammonium metavanadate which is fused to vanadium pentoxide.

The above-described prior art process realized about 85 percent recovery of vanadium in the solvent extraction strip liquor, while requiring at least two precipitation steps and the use of excessive amounts of ammonium hydroxide and ammonium chloride.

It is an object of the present invention to provide a process for the direct recovery of essentially pure ammonium metavanadate from acidic organic solvent extraction stripping solutions.

It is another object to provide a process for direct recovery of greater than about 85 of the vanadium from the solvent extraction strip liquor as ammonium metavanadate.

It is a further object to provide a process for the production of ammonium metavanadate of very high purity.

Further objects will be apparent from the remaining disclosure and claims.

The process which accomplishes the above-mentioned objects comprises adding to an acidic vanadyl solution having a pH less than 1.0 and containing at least one of the impurities selected from the group consisting of iron, alumina, phosphates and arsenates an amount of sodium chlorate at least suffucient to oxidize the vanadium in the acidic vanadyl solution to the pentavalent state; preparing a second aqueous solution of sodium carbonate and adding ammonia thereto; adding the oxidized acidic vanadium solution to the second aqueous solution of sodium carbonate to which ammonia has been added, the total amount of sodium carbonate in the second aqueous solution and the amount of ammonia added thereto being sufficient to adjust the pH of the resulting mixture to and maintain the pH of the resulting mixture at about 7.0 to 8.0 and the total amount of ammonia added to the mixture being amounts sufficient to provide less than 55 percent of the total neutralizing effect of sodium carbonate plus ammonia required to maintain the pH of the resulting mixture between about 7.0 and 8.0; digesting the solution at a temperature ranging from 70 to 90 degrees centigrade for a period of time sufficient to allow precipitation of impurities in a filterable form while sustaining the pentavalent vanadium in solution; filtering the impurities from the mixture; adding ammonium chloride to the mixture in amounts sufficient to cause precipitation of ammonium metavanadate; and removing the ammonium metavanadate from the mixture.

A preferred process for preparation of ammonium metavanadate comprises the aforementioned steps for preparation and oxidation of the vanadium of an acidic vanadyl solution to the pentavalent state than preparing a second aqueous solution of sodium carbonate containing sufficient sodium carbonate to provide at least 45 percent of the total neutralizing effect required to adjust the pH of the oxidized acidic vanadium solution to a pH of about 7.0 to 8.0; adding the oxidized acidic vanadium solution to the second aqueous solution of sodium carbonate until the pH of the resulting mixture begins to approach a pH of about 7.0 to 8.0 from the basic side and then simultaneously adding ammonia and the remainder of the oxidized acidic vanadyl solution to the mixture to maintain the pH of the mixture in the range of from 7.0 to 8.0 the total amount of ammonia added to the mixture being amounts sufficient to provide less than 55 percent of the total neutralizing effect of sodium carbonate plus ammonia required to maintain the pH of the mixture between about 7.0 and 8.0 and digesting the mixture; filtering out the impurity precipitate and precipitating ammonium metavanadate in accordance with the afore-mentioned process.

The acidic vanadyl starting solutions contain tetravalent vanadium. Tetravalent vanadium is generally considered to be insoluble in solutions ranging from a pH of about 2.5 to greater than 9. Sodium chlorate oxidizes the vanadium in the vanadyl solution to pentavalent vanadium. Pentavalent vanadium is generally thought to have a maximum insolubility between a pH of about 2.0 and 2.5 with increasing solubility at pH's greater than 2.5 and having virtually complete solubility at a pH between about 7.0 to 8.0. As the amount of cation such as sodium is increased in the pentavalent vanadium solution some precipitation of pentavalent vanadium may commence at pH's between about greater than 1.0 to 2.0 dependent upon the concentration of sodium ion or impurity cations in the solution.

Pentavalent vanadium is a constituent ionic species of the desired ammonium metavanadate product; consequently sodium chlorate is added to the acidic vanadyl starting solution to oxidize vanadium from the tetravalent state to the pentavalent state.

The oxidation step is necessary because of the solubility of pentavalent vanadium at a pH ranging from 7.0 to about 8.0 which pH range is the range of insolubility of the impurities in the starting vanadyl solution. These impurities are removed by a precipitation phase which is conducted prior to the final precipitation of pure ammonium metavanadate.

The pH of the starting solution must be maintained below about 1.0 especially after sodium chlorate is added to insure that pentavalent vanadium will remain in solution in the presence of the sodium cations added in the sodium chlorate oxidation step.

As the oxidized acidic vanadium solution is added to the second sodium carbonate solution there is a rapid neutralization of the oxidized acidic vanadium solution as the pH rapidly changes from less than about 1.0 to between about 7.0 and 8.0. During this neutralization the mixture does expose pentavalent vanadium in the presence of sodium cation to its maximum-insolubility pH range of about 2.0 to 2.5 but the change is so rapid that the vanadium pentoxide does not have sufficient time to coact with sodium or impurity ions at pH's between about 2.0 and 2.5 to nucleate and precipitate as sodium metavanadate. It should be noted that polyvanadates in general do not precipitate instantaneously but undergo a period of relatively slow nucleation and particle size growth dependent upon variables including pH and temperature and cationic concentration.

In the present process it is essential that pentavalent vanadium not remain in contact with precipitating cations such as sodium in a static pH environment having values outside the range of about 7.0 to 8.0. If pentavalent vanadium is allowed to remain in contact with precipitating ions such as sodium at a pH between about 1.5 and about 7.0, polyvanadates will precipitate in amounts dependent upon the concentration of cation and the static pH of the system.

In the present process the sodium carbonate and/or sodium carbonate-ammonia containing solution must be sufficiently basic to result in a final mixture, after addition of acidic oxidized vanadium solution is added, which has a pH in the range of from about 7.0 to 8.0.

By the same token, and equally critical, is the concentration of ammonium in the sodium carbonate solution which accrues from the addition of ammonia thereto. The relative amounts of sodium carbonate and ammonia utilized to adjust and maintain the mixture at a pH between 7.0 and 8.0 may be varied but it is essential that less than about 55 percent of the total neutralization effect be produced by the addition of ammonia. Neutralization of the mixture by using greater than the amount of ammonia required to cause greater than about 55 percent of the total neutralizing effect causes precipitation of ammonium metavanadate prematurely with the impurities. It is preferred to produce about 50 percent of the total neutralizing effect by addition of ammonia.

If greater than 55 percent of the total neutralizing effect is acquired by the addition of ammonia to the sodium carbonate-oxidized vanadium solution, ammonium polyvanadates will precipitate with the impurities.

Several advantages result from the use of ammonia in the present process. Ammonia aids in raising the pH of the solution by (formation of ammonium ion) to effect precipitation of impurities while simultaneously providing a precipitation cation for the subsequent precipitation of vanadium from the solution (e.g. ammonium ion). Consequently a smaller amount of expensive sodium carbonate and ammonium chloride are required in the overall process.

The above criterion can be satisfied by adding the acidic oxidized vanadium solution to a sodium carbonate solution to which ammonia has been added in amounts in accordance with the above criterion and which solution is sufficiently basic to result in a final oxidized vanadium-sodium carbonate-ammonium solution having a pH in the range of from 7.0 to 8.0. This method results in some loss in ammonia efficiency.

The most preferred process resulting in maximum efficiency of ammonia comprises preparing a sodium carbonate solution containing sufficient sodium carbonate to provide at least 45 percent, and preferably 50 percent, of the total neutralizing effect required to increase the pH of a given amount of acidic oxidized vanadium bearing solution to a pH between 7.0 and 8.0. The acidic oxidized vanadium bearing solution is then added to the sodium carbonate solution until the pH of the resulting mixture begins to approach a pH of about 7.0 from the basic side. As a pH of 7.0 is approached from the basic side ammonia and the remaining portion of oxidized acidic vanadium solution are simultaneously added to the mixture to maintain the pH of the mixture in the range of from about 7.0 to 8.0. The total amount of ammonia added to the mixture being amounts sufficient to provide less than 55 percent, preferably 50 percent, of the total neutralizing effect of sodium carbonate plus ammonia required to maintain the pH of the mixture between about 7.0 and 8.0.

Sodium chlorate must be added before the introduction of ammonia into the mixture. It has been found that ammonium ion itself will be oxidized and dissociated preferential to the oxidation of vanadium to the pentavalent state. If the oxidation of vanadium is not virtually complete before the introduction of ammonia, incomplete oxidation of vanadium results and ammonia is inefficiently utilized. Failure to oxidize vanadium to the pentavalent state before neutralization with ammonia and sodium carbonate leads to precipitation of vanadium values with the impurities.

The amount of sodium chlorate required is dependent, to some extent, upon the type and amount of impurities present and the extent to which they will consume the oxidizer. A sufficient amount of sodium chlorate is required to at least oxidize substantially all the vanadium to the pentavalent state. Preferably, in some instances, it is desired to add an excess of sodium chlorate required to oxidize all the vanadium present to the pentavalent state. The excess oxidant provides for the oxidation of impurities. Although oxidation of impurities is preferred, a substantial portion of the impurities will precipitate upon neutralization of the solution even when an excess of sodium chlorate is not present.

A temperature ranging from about 70 degrees centigrade to about 90 degrees centigrade may be utilized during digestion of the solution to remove impurities. A temperature of 80 to 85 degrees centigrade is considered the optimum temperature during digestion. Temperatures in excess of about 85 degrees may cause substantial loss of ammonia by volatization. A period of one hour is approximately the desired digestion period although the extent of the digestion period may be affected by the type of impurities and the ease with which a filterable impurity precipitate is obtained.

The precipitate may be washed in dilute ammonium chloride or cold water, for example, to remove any residual calcium and sulfate solution and calcined at a temperature ranging from 700° C. to 800° C. in accordance with well known techniques to produce vanadium pentoxide of high purity.

The barren solution remaining after precipitation may be recycled for use as a part of the makeup wash water to water leach roasted vanadium ore.

The following embodiment is illustrative of the present process.

A solvent extraction strip liquor containing 9.46 gms. $V_2O_5$/100 ml., 0.164 gm. FE/100 ml. and 0.36 gm. Al/100 ml. was used as a source of vanadium.

The liquor may be selected in a 250 ml. amount and oxidized with 5 grams of sodium chlorate. This solution is then added to a solution containing 32.9 grams of sodium carbonate dissolved in 100 ml. of water while ammonia is added to the mixture. The final pH is about 7.55 at 80° C. The solution is stirred at 80–85° C. for a period of time sufficient to cause precipitation of filterable impurities. Ammonium chloride is then added in amounts sufficient to precipitate ammonium metavanadate.

The following is a tabulation of typical reagent consumption.

| Reagent: | Consumption per lb. of $V_2O_5$ in the strip liquor |
|---|---|
| Sodium chlorate | lbs.  0.2114 |
| Sodium carbonate | lbs.  1.391 |
| Ammonia | lbs.  0.6123 |
| Ammonium chloride | lbs.  0.67 |

The following is a typical tabulation of Distribution of $V_2O_5$.

| Distribution of $V_2O_5$: | Percent |
|---|---|
| In impurity cake | 3.52 |
| In filtrate and washes | 2.64 |
| In ammonium metavanadate product | 93.84 |
| | 100.00 |

The following is a large scale example of the present novel process.

Approximately 28,000 pounds of an aqueous solution containing about 30 percent by weight sodium carbonate was added to a process tank. About 57,000 pounds of a separate acidic sulphate solvent extraction product liquor containing about 7.0 percent $V_2O_5$ was treated with about 900 pounds of sodium chlorate to oxidize the vanadium to the pentavalent state. An amount of the oxidized solvent extraction product liquor was then added to the process tank containing sodium carbonate until a pH of about 7.0 to 8.0 was reached and ammonia was added to the mixture as the remaining solvent extraction product liquor was added to maintain a pH of about 7.0 to 7.2. The mixture was then digested for a period of about 2.0 hours at a temperature of approximately 85.0° C. to allow precipitation of impurities. The purified vanadium-containing solution was then treated with about 1.4 pounds of ammonium chloride per pound of $V_2O_5$ to precipitate ammonium metavanadate. The recovery of vanadium averaged about 95.0 percent.

The average reagent consumption was:

| Reagent: | Consumption per lb. of $V_2O_5$ in the strip liquor |
|---|---|
| Sodium chlorate | lbs__ 0.22 |
| Sodium carbonate | lbs__ 2.1 |
| Ammonia | lbs__ 0.30 |
| Ammonium chloride | lbs__ 1.40 |

What I claim is:

1. A process for producing ammonium metavanadate comprising adding to an acidic vanadyl solution having a pH less than about 1.0 and containing at least one of the impurities selected from the group consisting of iron, alumina, phosphates and arsenates an amount of sodium chlorate at least sufficient to oxidize the vanadium in the acidic vanadyl solution to the pentavalent state; preparing a second aqueous solution of sodium carbonate and adding ammonia thereto; adding said oxidized acidic vanadium solution to said second aqueous solution of sodium carbonate to which ammonia has been added, the total amount of sodium carbonate in said second aqueous solution and ammonia added to said second aqueous solution being sufficient to adjust the pH of the resulting mixture to and maintain the pH of the resulting mixture at about 7.0 to 8.0 and the total amount of ammonia added to said mixture being amounts sufficient to provide less than 55 percent of the total neutralizing effect of sodium carbonate plus ammonia required to maintain the pH of said resulting mixture between about 7.0 and 8.0; digesting the solution at a temperature ranging from 70 to 90 degrees centigrade for a period of time sufficient to allow precipitation of impurities in a filterable form while sustaining pentavalent vanadium in solution; filtering the impurities from the mixture; adding ammonium chloride in amounts sufficient to cause precipitation of ammonium metavanadate; and removing the ammonium metavanadate from the mixture.

2. A process for producing ammonium metavanadate comprising adding to an acidic vanadyl solution having a pH less than about 1.0 and containing at least one of the impurities selected from the group consisting of iron, alumina, phosphates and arsenates an amount of sodium chlorate at least sufficient to oxidize the vanadium in the acidic vanadyl solution to the pentavalent state; preparing a second aqueous solution of sodium carbonate containing sufficient sodium carbonate to provide at least 45 percent of the total neutralizing effect required to adjust the pH of a given amount of said oxidized acidic vanadium solution to a pH of about 7.0 to about 8.0; adding the oxidized acidic vanadium solution to said second aqueous solution of sodium carbonate until the pH of the resulting mixture begins to approach a pH of about 7.0 to 8.0 from the basic side and then simultaneously adding ammonia and the remainder of said oxidized acidic vanadium solution to said mixture to maintain the pH of said mixture in the range of from 7.0 to 8.0, the total amount of ammonia added to said mixture being amounts sufficient to provide less than 55 percent of the total neutralizing effect of sodium carbonate plus ammonia required to maintain the pH of said mixture between about 7.0 and 8.0; digesting the solution at a temperature ranging from 70 to 90 degrees centigrade for a period of time sufficient to allow precipitation of impurities in a filtering form while sustaining pentavalent vanadium in solution; filtering the impurities from the mixture; adding ammonium chloride in amounts sufficient to cause precipitation of ammonium metavanadate; and removing the ammonium metavanadate from the mixture.

References Cited in the file of this patent

UNITED STATES PATENTS

| 2,211,119 | Hixon et al. | Aug. 13, 1940 |
| 2,551,733 | Dunn et al. | May 8, 1951 |

OTHER REFERENCES

German application, 1,010,540, printed June 19, 1957, Kl. 16–2.

UNITED STATES PATENT OFFICE
CERTIFICATE OF CORRECTION

Patent No. 3,063,795            November 13, 1962

George S. Smith

It is hereby certified that error appears in the above numbered patent requiring correction and that the said Letters Patent should read as corrected below.

Column 2, line 18, for "than" read -- then --; column 4, line 55, for "FE" read --Fe --; column 6, line 39, for "filtering" read -- filterable --.

Signed and sealed this 2nd day of July 1963.

(SEAL)
Attest:

ERNEST W. SWIDER
Attesting Officer

DAVID L. LADD
Commissioner of Patents